US012725933B2

(12) United States Patent
Williams et al.

(10) Patent No.: US 12,725,933 B2
(45) Date of Patent: Sep. 1, 2026

(54) PHASED ARRAY ANTENNA FOR COMMERCIAL SATELLITE COMMUNICATIONS (SATCOM)

(71) Applicant: Georgia Tech Research Corporation, Atlanta, GA (US)

(72) Inventors: Wyman Williams, Atlanta, GA (US); Christopher Coen, Atlanta, GA (US); Diandian Chen, Atlanta, GA (US); Daniel Dykes, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 55 days.

(21) Appl. No.: 18/849,605

(22) PCT Filed: Mar. 23, 2023

(86) PCT No.: PCT/US2023/064842
§ 371 (c)(1),
(2) Date: Sep. 23, 2024

(87) PCT Pub. No.: WO2023/183862
PCT Pub. Date: Sep. 28, 2023

(65) Prior Publication Data

US 2025/0202129 A1 Jun. 19, 2025

Related U.S. Application Data

(60) Provisional application No. 63/269,826, filed on Mar. 23, 2022.

(51) Int. Cl.
*H01Q 21/00* (2006.01)
*H01Q 1/24* (2006.01)
(Continued)

(52) U.S. Cl.
CPC ........... *H01Q 21/0025* (2013.01); *H01Q 1/24* (2013.01); *H01Q 3/34* (2013.01); *H01Q 21/061* (2013.01)

(58) Field of Classification Search
CPC .... H01Q 1/24; H01Q 21/0025; H01Q 21/061; H01Q 3/34
See application file for complete search history.

(56) References Cited

U.S. PATENT DOCUMENTS 4,474,065 A * 10/1984 Miessler ............... B06B 1/0622 73/628
5,640,143 A * 6/1997 Myron ................. G08B 29/185 340/567
(Continued)

OTHER PUBLICATIONS

International Search Report and Written Opinion from Application No. PCT/US2023/064842 dated Aug. 4, 2023 (12 pages).

*Primary Examiner* — Thien M Le
(74) *Attorney, Agent, or Firm* — TROUTMAN PEPPER LOCKE LLP; Ryan A. Schneider; Elsie Yang

(57) ABSTRACT

An exemplary embodiment provides an array antenna, comprising a transmitter aperture and a receiver aperture. The transmitter aperture can comprise a first plurality of printed circuit boards, each comprising first arrays of radiating elements. Each of the radiating elements in the first arrays of radiating elements can comprise first arrays of pixels. Each of the pixels in the first arrays of pixels can be conductive or non-conductive. The receiver aperture can comprise a second plurality of printed circuit boards, each comprising second arrays of radiating elements. Each of the radiating elements in the second arrays of radiating elements can comprise second arrays of pixels. Each of the pixels in the second arrays of pixels can be conductive or non-conductive. The transmitter and receiver apertures can be config-
(Continued)

ured to transmit and receive, respectively, a single beam (such as a wireless communication signal).

20 Claims, 11 Drawing Sheets

(51) Int. Cl.
*H01Q 3/34* (2006.01)
*H01Q 21/06* (2006.01)

(56) References Cited

U.S. PATENT DOCUMENTS

| | | | | |
|---|---|---|---|---|
| 5,898,644 | A * | 4/1999 | Ganter | G04C 3/14 368/88 |
| 8,596,885 | B2 * | 12/2013 | Karnopp | H04B 10/40 385/88 |
| 10,218,490 | B1 * | 2/2019 | Yang | H04L 5/1461 |
| 10,224,979 | B1 | 3/2019 | Hunter et al. | |
| 10,649,067 | B1 * | 5/2020 | Yang | G01S 7/038 |
| 2003/0026552 | A1 * | 2/2003 | Goode | G02B 6/4257 385/88 |
| 2003/0027440 | A1 * | 2/2003 | Birch | G02B 6/4283 29/830 |
| 2003/0202656 | A1 * | 10/2003 | Ikeuchi | H04M 1/0245 379/419 |
| 2007/0215913 | A1 * | 9/2007 | Okubora | H10W 90/00 257/E25.013 |
| 2009/0278762 | A1 | 11/2009 | Lopez et al. | |
| 2015/0200453 | A1 | 7/2015 | Stambovsky | |
| 2017/0229775 | A1 | 8/2017 | Navarro et al. | |
| 2019/0120962 | A1 * | 4/2019 | Gimpel | G01S 7/4808 |
| 2020/0020276 | A1 | 1/2020 | Cho et al. | |

* cited by examiner

PHASED ARRAY ANTENNA FOR COMMERCIAL SATELLITE COMMUNICATIONS (SATCOM)

CROSS-REFERENCE TO RELATED APPLICATIONS

This application claims the benefit of U.S. Provisional Application Ser. No. 63/269,826, filed on 23 Mar. 2022, which is incorporated herein by reference in its entirety as if fully set forth below.

FIELD OF THE DISCLOSURE

The various embodiments of the present disclosure relate generally to antennas and more particularly for phased array antennas for commercial satellite communications.

BACKGROUND

As travel becomes more ubiquitous, there is a growing need for satellite communications (SATCOM) from mobile platforms, such as commercial aircrafts and trains. A primary use for SATCOM is internet connectivity for travelers. Traditional SATCOM antennas, however, are mechanically steered. These moving parts tend to break much more easily and frequently than electronic parts, making these conventional antennas unreliable. Active Electronically Scanned Array ("AESA") antennas, on the other hand, are electronically steered and, therefore, have no moving parts. For this reason, AESA-based SATCOM antennas promise improved reliability (e.g., longer operating lifetimes, less frequent replacements, graceful performance degradation, etc.) compared to traditional mechanically-steered SATCOM antennas. Accordingly, there is a need for improved AESA-based SATCOM antennas.

BRIEF SUMMARY

An exemplary embodiment of the present disclosure provides an array antenna, comprising a transmitter aperture and a receiver aperture. The transmitter aperture can comprise a first plurality of printed circuit boards. Each printed circuit board in the first plurality of printed circuit boards can comprise first arrays of radiating elements. Each of the radiating elements in the first arrays of radiating elements can comprise first arrays of pixels. Each of the pixels in the first arrays of pixels can be conductive or non-conductive. The transmitter aperture can be configured to generate a single beam (such as a wireless communication signal). The receiver aperture can comprise a second plurality of printed circuit boards. Each printed circuit board in the second plurality of printed circuit boards can comprise second arrays of radiating elements. Each of the radiating elements in the second arrays of radiating elements can comprise second arrays of pixels. Each of the pixels in the second arrays of pixels can be conductive or non-conductive. The receiver aperture can be configured to receive a single beam (such as a wireless communication signal).

In any of the embodiments disclosed herein, each radiating element in the first and second arrays of radiating elements can be configured to operate in each of a horizontal and vertical polarization.

In any of the embodiments disclosed herein, the first plurality of printed circuit boards can comprise four printed circuit boards.

In any of the embodiments disclosed herein, each of the first arrays of radiating elements can be arranged in a 22×22 square array of radiating elements.

In any of the embodiments disclosed herein, each radiating element in the first arrays of radiating elements can have a length of 1.07 cm and a width of 1.07 cm.

In any of the embodiments disclosed herein, the radiating elements in the first arrays of radiating elements can have an operating frequency of 13.75-14.5 GHz.

In any of the embodiments disclosed herein, each of the first arrays of pixels can be arranged in a 64×64 array of pixels.

In any of the embodiments disclosed herein, each of the conductive pixels in the first arrays of pixels can be metal and each of the non-conductive pixels in the first arrays of pixels can be non-metal.

In any of the embodiments disclosed herein, each of the 64×64 first arrays of pixels can be represented by the following hexadecimal sequence:

0x3c33cc0ff033cc3c07e1999e799987e087e1999e79998
7e183cf0f33ccf0f3c183cf0f33ccf0f3c1e187fe1e787fe
1877887fe1e787fe1067c0ff0c0030ff0207e0ff0c0030
ff0787801f800001f8018e001f800001f80018000cfc3c
3f302071980cfc3c3f306061f8067ffffe600609f8067ff
ffe61861ffe033cff3cc3e61e7f833cff3cc7e7987fe1e1ff
8781e7f07e78e1ff870067e67e1c0f3cf00067efe7860f
3cf0006679e1e6181818000071e11
fe0818118000678 1f840000386600619f9e000061ff80
019f980000619f801806180001f99f807e067803c3fff9
80e607e003c7fff981e607e00000ffff81fe1ff81801ffe7
81981ffe1801ffe181981ffe1801ffe181fe1ff81801ffe78
1e607e00001ffff81e607e00007fff9817e06780003fff98
01806180811f99f80019f981818619f80619f9e3ffc61ff
80781f843ffc3866001e1fe0fffff1800069
e1e61ffff800007fe78633ffcc0066767e1c33ffcc0067e07
e7801ff800067e87fe001ff8001e7fe7f800ffff007e79ff
e000ffff03e619f80819ff98118611f81819ff98180601
983c0fc3f03c6068003c0fc3f03c207e009f9e6679f900
17819f9e6679f98187e0000ffff0000787c0000ffff00002
07887f800001fe106e187f800001fe18780c0f000000f0
30180c0f000000f030186187e00007e186106187e000
07e18603c33cc0ff033cc3c, wherein a binary 1 can indicate the corresponding pixel is metal and a binary 0 can indicate the corresponding pixel is non-metal.

In any of the embodiments disclosed herein, each of the first plurality of printed circuit boards can further comprise a front-end beam forming integrated circuit.

In any of the embodiments disclosed herein, each of the first plurality of printed circuit boards can further comprise a passive planar beamformer network.

In any of the embodiments disclosed herein, each of the first plurality of printed circuit boards can comprises a substrate having a thickness of 0.060 inches.

In any of the embodiments disclosed herein, each of the first plurality of printed circuit boards can have a dielectric constant of 3.5.

In any of the embodiments disclosed herein, the second plurality of printed circuit boards can comprise four printed circuit boards.

In any of the embodiments disclosed herein, each of the second arrays of radiating elements can be arranged in a 20×20 square array of radiating elements.

In any of the embodiments disclosed herein, each radiating element in the second arrays of radiating elements can have a length of 1.21 cm and a width of 1.21 cm.

In any of the embodiments disclosed herein, the radiating elements in the second arrays of radiating elements can have an operating frequency of 10.7-12.75 GHz.

In any of the embodiments disclosed herein, each of the second arrays of pixels can be arranged in a 64×64 array of pixels.

In any of the embodiments disclosed herein, each of the conductive pixels in the second arrays of pixels can be metal and each of the non-conductive pixels in the second arrays of pixels can be non-metal.

In any of the embodiments disclosed herein, each of the 64×64 second arrays of pixels can be represented by the following hexadecimal sequence:

0x300cc0cc3303300c0618799ff99e18608618799ff99e18
6180f0c00ff0030f0300f0c00
ff0030f0660187fe667fe180660187fe667fe18060000f3
0ff0cf00201800f30ff0cf006018067
f9ff9fe606618067f9ff9fe61e67e003c33cc3c0380e6003
c33cc3c06018061867ffe6180070060867ffe611806000
43c3ffc3c386099863c3ffc3c6079ffe01867e618607967
f98867e610606067f9c03ffc0200006679e03ffc078000
067f807ffe07860007e6007ffe1e078067e0000ff03801
86e660000ff0619807860666000019e01061ffe00019
8600607f9e00021fe000f9e79f80079e6181ffe7ff8001
9807877ffff800018079e79fff80067807f879fff8006
7807f87ffff800018079effe7ff8001980787f9e79f8007
9e6181607f9e00021fe000061ffe0990198600860666l
998019e01e660000c3061980767e0000c3038018607e
60081811e0780067f818181878600667 9e33ffcc78000
67f9c33ffcc2000067f98e1818706060ffe01e18187860
7999860cf00f30607900040cf00f3038600060e01818
0718068061e01818078007e60300c00300c6017e0300
c00300c38018080667e66011e618180667e660186618
30030ff0c00c600030030ff0c00c2060e1e0018007870
661e1e001800787860000c003c00300068000c003c00
300038e66018661806671 1e66018661806678300cc0c
c3303300c, wherein a binary 1 can indicate the corresponding pixel is metal and a binary 0 can indicate the corresponding pixel is non-metal.

In any of the embodiments disclosed herein, each of the second plurality of printed circuit boards can further comprise a front-end beam forming integrated circuit.

In any of the embodiments disclosed herein, each of the second plurality of printed circuit boards can further comprise a passive planar beamformer network.

In any of the embodiments disclosed herein, each of the second plurality of printed circuit boards can comprise a substrate having a thickness of 0.090 inches.

In any of the embodiments disclosed herein, each of the second plurality of printed circuit boards can have a dielectric constant 3.5.

Another embodiment of the present disclosure provides an array antenna comprising a transmitter aperture and a receiver aperture. The transmitter aperture can comprise four printed circuit boards. Each printed circuit board of the transmitter aperture can comprise a 22×22 array of radiating elements. Each radiating element of the transmitter aperture can comprise a 64×64 array of pixels. The receiver aperture can comprise four printed circuit boards. Each printed circuit board of the receiver aperture can comprise a 20×20 array of radiating elements. Each radiating element of the receiver aperture can comprise a 64×64 array of pixels. Each pixel can be metal or non-metal.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Figure 1:
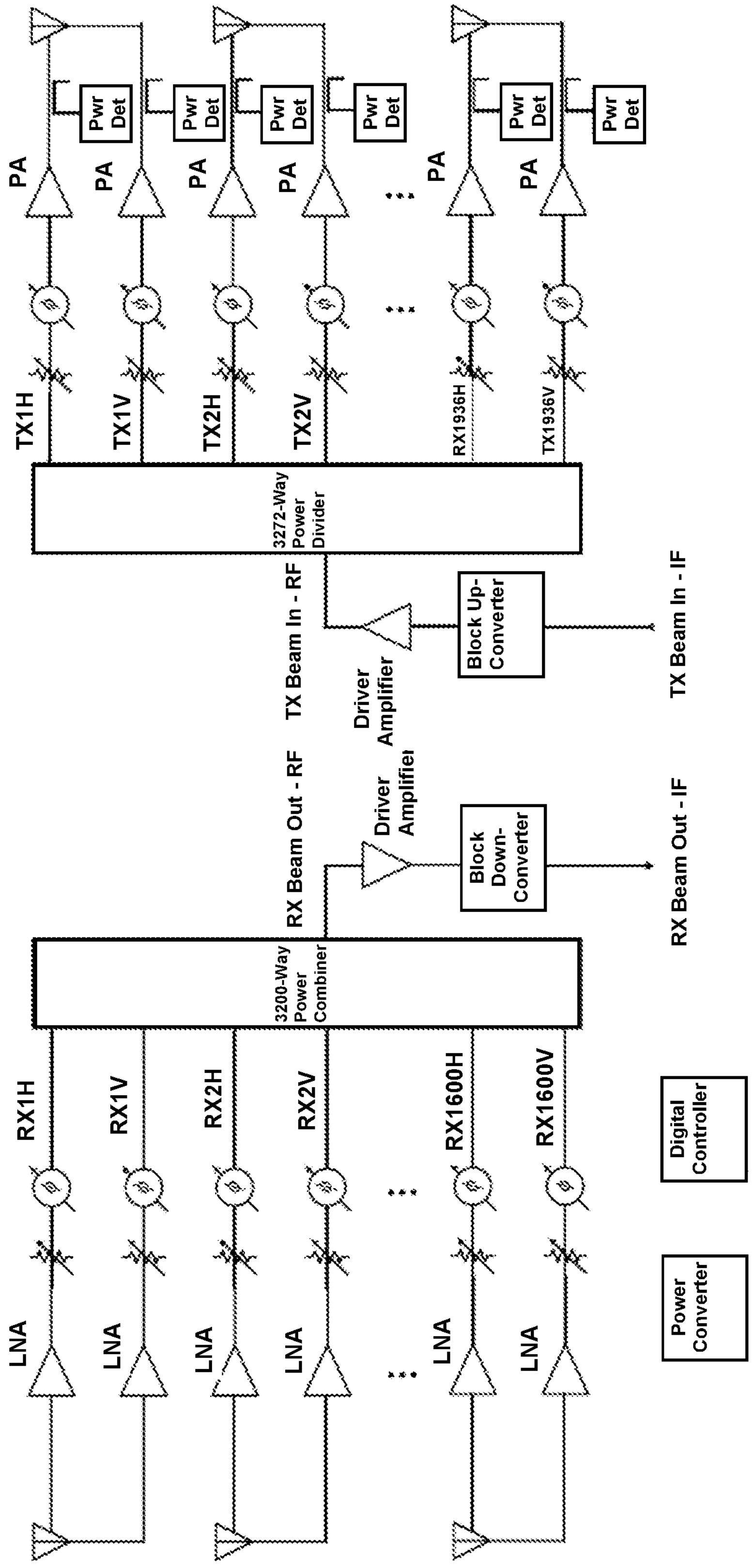
FIG. 1 provides a block diagram for an antenna array, in accordance with some embodiments of the present disclosure.

Disclosed herein are AESA antenna designs that can be used for Ku-band satellite communications from airborne platforms and/or trains. Embodiments disclosed herein provide a novel application of fragmented aperture antenna technology. FIG. 1 provides a block diagram for an exemplary antenna array of the present disclosure.

Each antenna can comprise two separate apertures—a transmit aperture and a receive aperture. The AESA antennas can support one TX beam and one RX beam. The TX and RX beams can be completely independent and may point in different directions with different polarizations.

Figure 2:
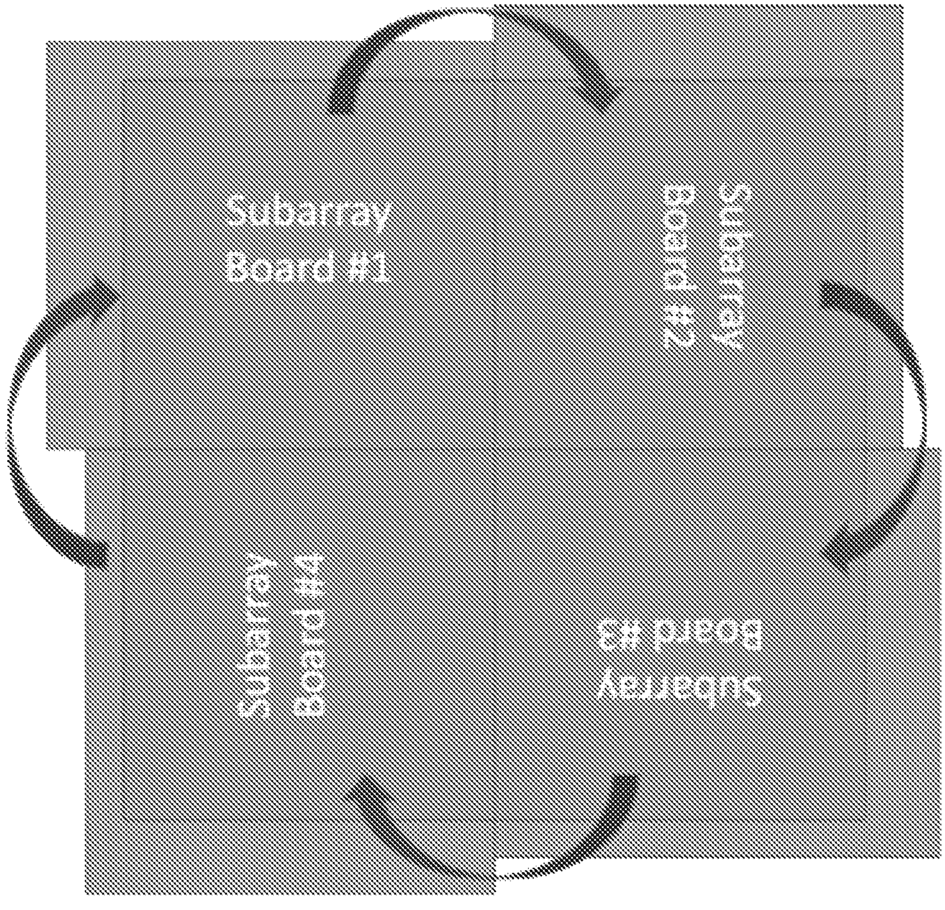
FIG. 2 provides a diagram of subpanel printed circuit boards in transmit and receive apertures, in accordance with some embodiments of the present disclosure.

As shown in FIG. 2, each of the transmit and receive apertures can comprise one or more printed circuit boards. In an exemplary embodiments of the present disclosure, the transmit and receive apertures each comprise four PCBs. The PCBs can be mounted on a mechanical support structure in a 2×2 array, as shown in FIG. 2. Each of the PCBs can comprise a plurality of integrated circuits to create a beamforming network. For example, each PCB can comprise one or more front-end beam forming integrated circuits and one or more passive planar beamforming networks.

Each of the PCBs can also comprise a substrate including radiating elements (discussed below). The substrate thickness can be different on the transmit and receive PCBs. For example, the substrate can be 0.060 inches on the transmit PCBs and 0.090 inches on the receive PCBs. Both the transmit and receive PCBs can have a dielectric constant of 3.5.

Figure 3B:
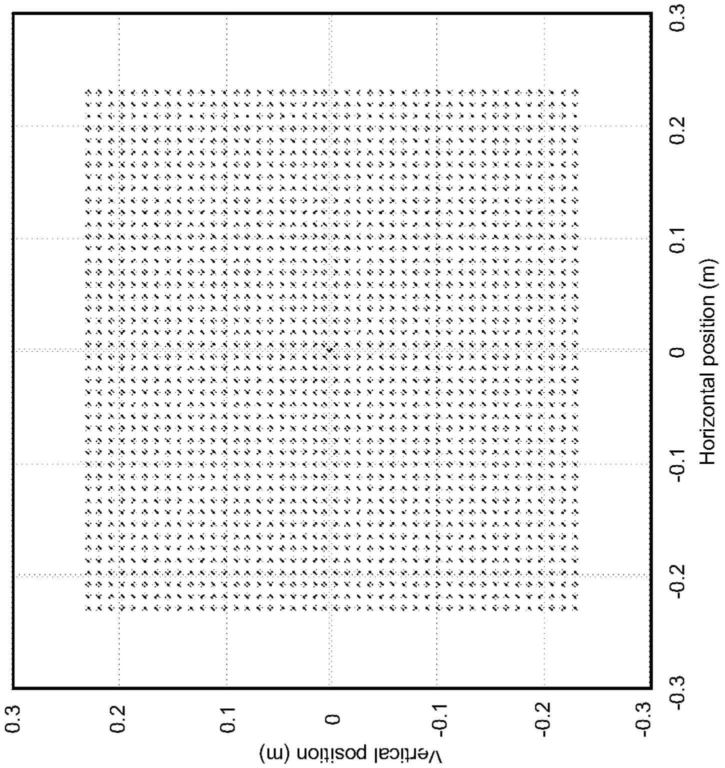
FIGS. 3A-B provide diagrams of radiating element positions (each dot refers to center location of radiating element) for a transmit aperture with a 44×44 array of radiating elements, in accordance with some embodiments of the present disclosure.
Figure 3A:
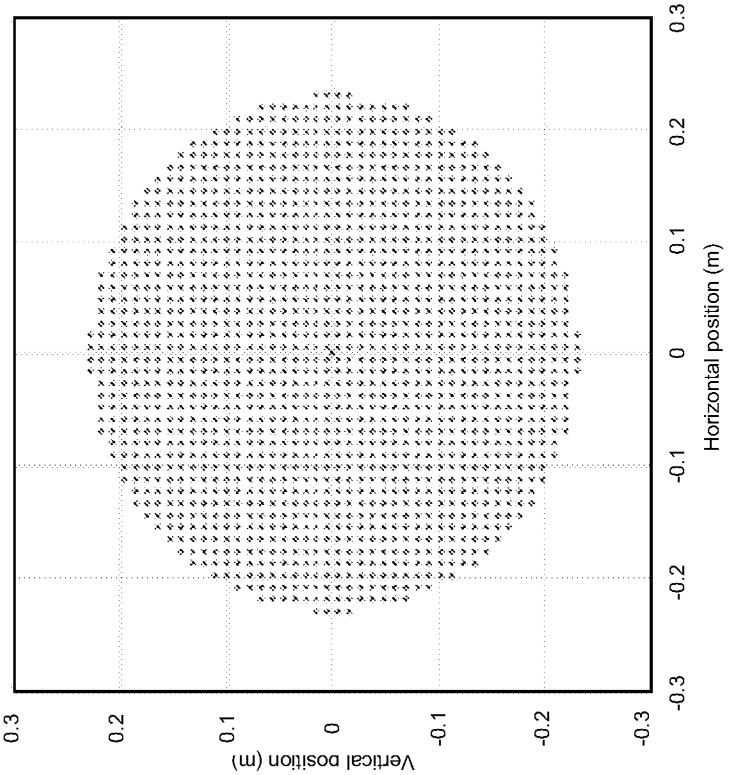
Figure 5:
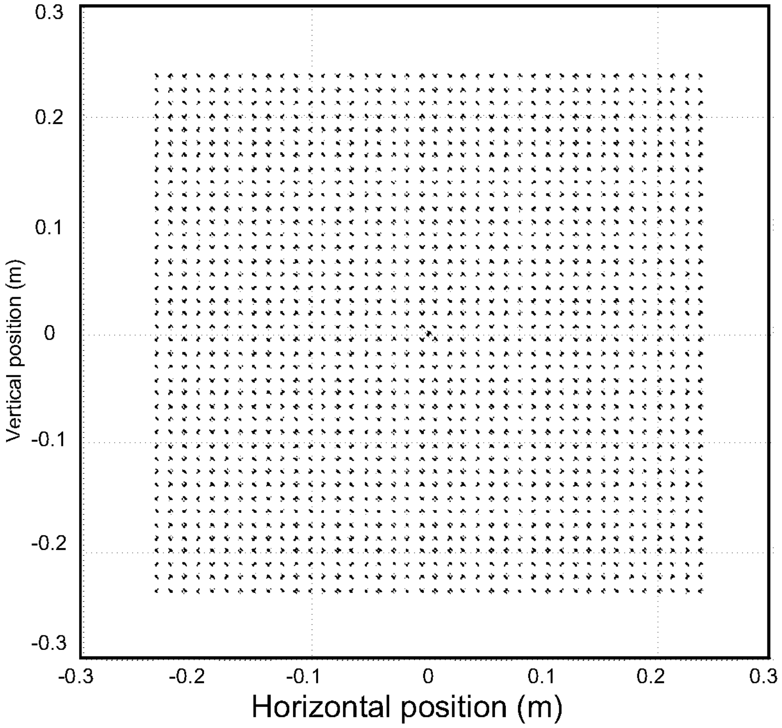
FIG. 5 provides a diagram of radiating element positions (each dot refers to center location of radiating element) for a receive aperture with a 40×40 array of radiating elements, in accordance with some embodiments of the present disclosure.

Each PCB can comprise an array of fragmented aperture radiating elements and a beamformer. The transmit and receive PCBs can have different radiating element and beamformer designs. For example, each of the transmit PCBs can comprise a 22×22 square array of radiating elements, which form a 44×44 array when four PCBs are combined, as shown in FIGS. 3A-B. Similarly, each of the receive PCBs can comprise a 20×20 square array of radiating elements, which form a 40×40 array when four PCBs are combined, as shown in FIG. 5. The radiating elements can have different dimensions in the transmit aperture versus the receive aperture. For example, each of the radiating elements in the transmit aperture can have a length and width of 1.07 cm, while each of the radiating elements in the receive aperture can have a length and width of 1.21 cm. The transmit and receive radiating elements can also operate at different frequencies, which can be non-overlapping. For example, the transmit radiating elements can operate within a frequency range of 13.75-14.5 GHz, while the receive radiating elements can operate within a frequency range of 10.7-12.75 GHz.

Figure 7:
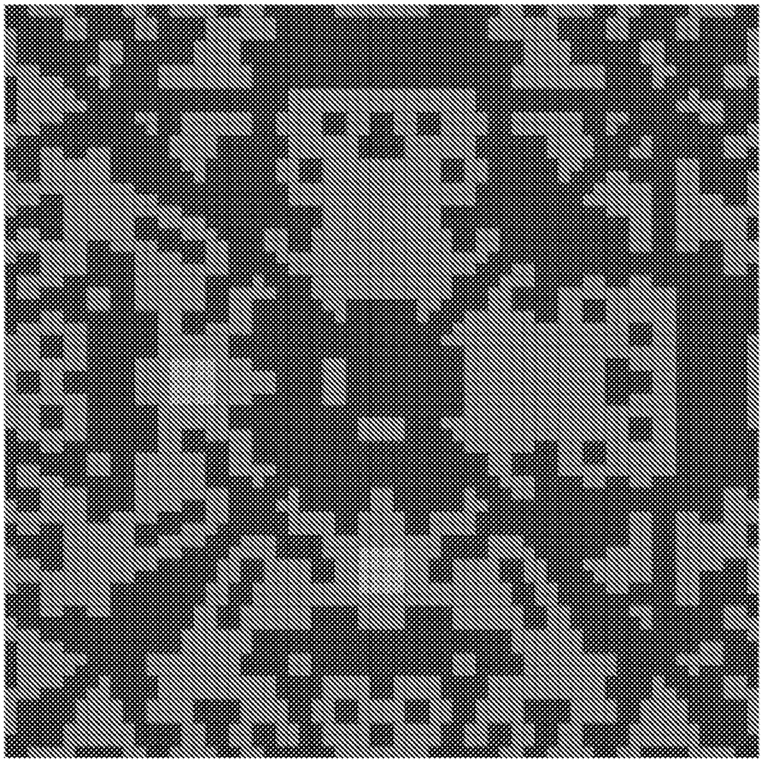
FIG. 7 provides an illustration of a 64×64 pixel array for a radiating element in a transmit aperture, in accordance with some embodiments of the present disclosure.
Figure 9:
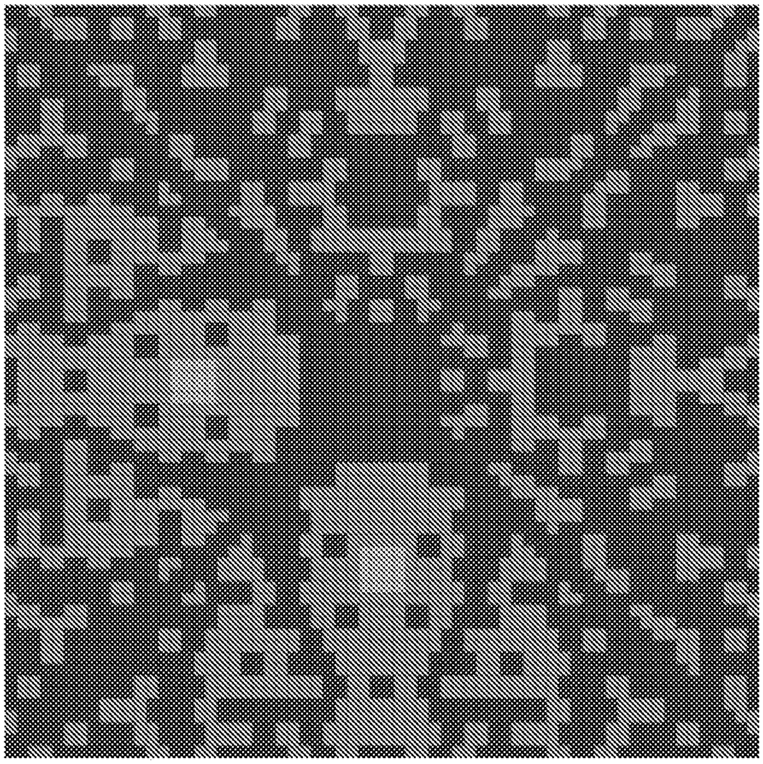
FIG. 9 provides an illustration of a 64×64 pixel array for a radiating element in a receive aperture, in accordance with some embodiments of the present disclosure.

Each of the radiating elements of the transmit and receive PCBs can comprise an array of pixels, as shown in FIGS. 7 & 9. In some embodiments, each of the transmit and receive radiating elements can comprise a 64×64 array of pixels. Each of the pixels can be conductive (e.g., metal), as shown in the lighter pixels in FIGS. 7 & 9, or non-conductive (e.g., non-metal), as shown in the darker pixels in FIGS. 7 & 9 (as also shown in FIGS. 7 & 9 with the lightest squares of 16 pixels, the 64×64 array can also include two polarization inputs). The pixel configurations in the transmit and receive radiating elements, however, can have different pixel arrangements, in which each pixel is either metal (conductive) or non-metal (non-conductive). The arrangement of metal/non-metal pixels in the 64×64 array can be represented by a hexadecimal sequence. When that hexadecimal sequence is converted to a binary sequence, each pixel has a binary value or 1 or 0, in which a binary 1 indicates the corresponding pixel is metal and a binary 0 indicates the corresponding pixel is nonmetal. For example, as shown in FIG. 7, the transmit 64×64 arrays of pixels can be represented with the following hexadecimal sequence:

0x3c33cc0ff033cc3c07e1999e799987e087e1999e79998
7e183cf0f33ccf0f3c183cf0f33ccf0f3c1e187fe1e787fe
1877887fe1e787fe1067c0ff0c0030ff0207e0ff0c0030ff
0787801f800001f8018e001f800001f80018000cfc3c3
f302071980cfc3c3f306061f8067ffffe600609f8067ffff
e61861ffe033cff3cc3e61e7f833cff3cc7e7987fe1e1ff87
81e7f07e78e1ff870067e67e1c0f3cf00067efe7860f3cf
0006679e1e6181818000071e1fe0818118000678 1f84
000038660061 9f9e000061ff80019f980000619f80180
6180001f99f807e067803c3fff980e607e003c7fff981e
607e00000ffff81fe1ff81801ffe781981ffe1801ffe1819
81ffe1801ffe181fe1ff81801ffe781e607e00001ffff81e6
07e00007fff9817e06780003fff980180618081 1f99f80
019f981818619f80619f9e3ffc61ff80781f843ffc38660
01e1fe0ffff1800069e1e61ffff800007fe78633ffcc0066
767e1c33ffcc0067e07e7801ff800067e87fe001ff8001e
7fe7f800ffff007e79ffe000ffff03e619f80819ff98118611
f81819ff98180601983c0fc3f03c6068003c0fc3f03c20
7e009f9e6679f90017819f9e6679f98187e0000ffff000
0787c0000ffff0000207887f800001fe106e187f800001
fe18780c0f000000f030180c0f000000f030186187e000
07e186106187e00007e18603c33cc0ff033cc3c.

Similarly, as shown in FIG. 9, the receive 64×64 arrays of pixels can be represented with the following hexadecimal sequence:

0x300cc0cc3303300c0618799ff99e18608618799ff99e1
86180f0c00ff0030f0300f0c00
ff0030f0660187fe667fe180660187fe667fe18060000f
30ff0cf00201800f30ff0cf006018067
f9ff9fe606618067f9ff9fe61e67e003c33cc3c0380e600
3c33cc3c06018061867ffe6180070060867ffe61180600
043c3ffc3c386099863c3ffc3c6079ffe01867e6186079
67f98867e610606067f9c03ffc0200006679e03ffc078

000067f807ffe07860007e6007ffe1e078067e0000ff038
0186e660000ff0619807860666000019e01061ffe000
0198600607f9e00021fe000f9e79f80079e6181ffe7ff8
0019807877fffff800018079e79ffff80067807f879ffff80
067807f87fffff800018079effe7ff8001980787f9e79f80
079e6181607f9e00021
fe000061ffe0990198600860666199801 9e01e660000c
3061980767e0000c3038018607e60081811e0780067
f81818187860066 79e33ffcc7800067f9c33ffcc200006
7f98e1818706060ffe01e181878607999860cf00f3060
7900040cf00f3038600060e0181807180680 61e01818
078007e60300c00300c6017e0300c00300c380180806
67e66011e618180667e66018661830030ff0c00c6000
30030ff0c00c2060e1e0018007870661e1e0018007878
60000c003c00300068000c003c00300038e66018661
8066711e6601866180667830 0cc0cc3303300c.

When each of these hexadecimal sequences are converted to a binary sequency, the first 64 bits correspond to the first row of 64 pixels, the next 64 bits correspond to the second row of 64 pixels (above the first row), and so on.

Each radiating element in the transmit and receive PCBs can have dual polarization capability, e.g., they can operate in each of a horizontal and vertical polarization, so any desired polarization can be achieved by adjusting the relative phase and amplitude of each element's two terminals.

EXAMPLE

Below, an exemplary phased array antenna is described along with its performance. This example is disclosed for illustration purposes only, however, and should not be construed as limiting the scope of the present disclosure.

A block diagram of the designed active electronically scanned array (AESA) is shown in FIG. 1. It consists of two separate apertures, one for transmit (TX) and one for receive (RX). The RX antenna has a total of 1600 radiating elements and the TX antenna has 1936.

Each AESA design consists of four printed circuit boards (PCBs) in a 2×2 arrangement, with an overall physical aperture area of 50 cm×50 cm. Each TX PCB contains a 22×22 subarray (element spacing of 1.07 cm), and each RX PCB contains a 20×20 subarray (element spacing of 1.21 cm). Each PCB contains the subarray radiating elements, TX/RX front-end beamforming integrated circuits, a passive planar beamformer network, and supporting electronics. The subpanel PCBs are identical for each type of AESA (TX and RX) and are intended to be mounted in a windmill-like arrangement as shown in FIG. 2.

FIGS. 3A-B provide a diagram of radiating element positions in the exemplary antenna for the 44×44 element transmit aperture. The circular dots indicate the center of each radiating element. The array was designed in the square arrangement shown in FIG. 3B; however, the aperture can operate only a circular subset of the radiating elements in the full square array (FIG. 3A) in order to reduce the sidelobes. Similarly, FIG. 5 provides a diagram of radiating element positions in the exemplary antenna for the 40×40 element receive aperture.

FIG. 7 provides an illustration of the dual-polarized (vertical and horizontal) fragmented aperture radiating element for the transmit array antenna. The size of the element is a 1.21 cm square. Each dark square indicates where metal is not present, and each light square indicates where metal is present. The very light squares represent the feed locations for the two polarization inputs. The element was designed with a 60 mil substrate thickness with a dielectric constant of 3.5.

FIG. 9 provides an illustration of the dual-polarized (vertical and horizontal) fragmented aperture radiating element for the transmit array antenna. The size of the element is a 1.07 cm square. Each dark square indicates where metal is not present, and each light square indicates where metal is present. The very light squares represent the feed locations for the two polarization inputs. The element was designed with a 90 mil substrate thickness with a dielectric constant of 3.5.

Performance of Full Array

Table 1 shows the expected directivity and beamwidth for a full 44×44 element TX aperture, and Table 2 shows the expected directivity and beamwidth for a full 40×40 element RX aperture.

TABLE 1

Performance of the TX antenna

| Frequency (GHz) | Wavelength (cm) | Directivity (dB) | Half Power Beamwidth (°) |
|---|---|---|---|
| 13.75 | 2.18 | 36.1 | 3.25 |
| 13.9375 | 2.15 | 36.3 | 3.21 |
| 14.125 | 2.12 | 36.4 | 3.16 |
| 14.3125 | 2.09 | 36.5 | 3.12 |
| 14.5 | 2.07 | 36.6 | 3.08 |

TABLE 2

Performance of the RX antenna

| Frequency (GHz) | Wavelength (cm) | Directivity (dB) | Half Power Beamwidth (°) |
|---|---|---|---|
| 10.7 | 2.80 | 35.3 | 2.93 |
| 11.2125 | 2.67 | 35.7 | 2.80 |
| 11.725 | 2.56 | 36.1 | 2.68 |
| 12.375 | 2.42 | 36.6 | 2.54 |
| 12.75 | 2.35 | 36.8 | 2.46 |

Figure 4:
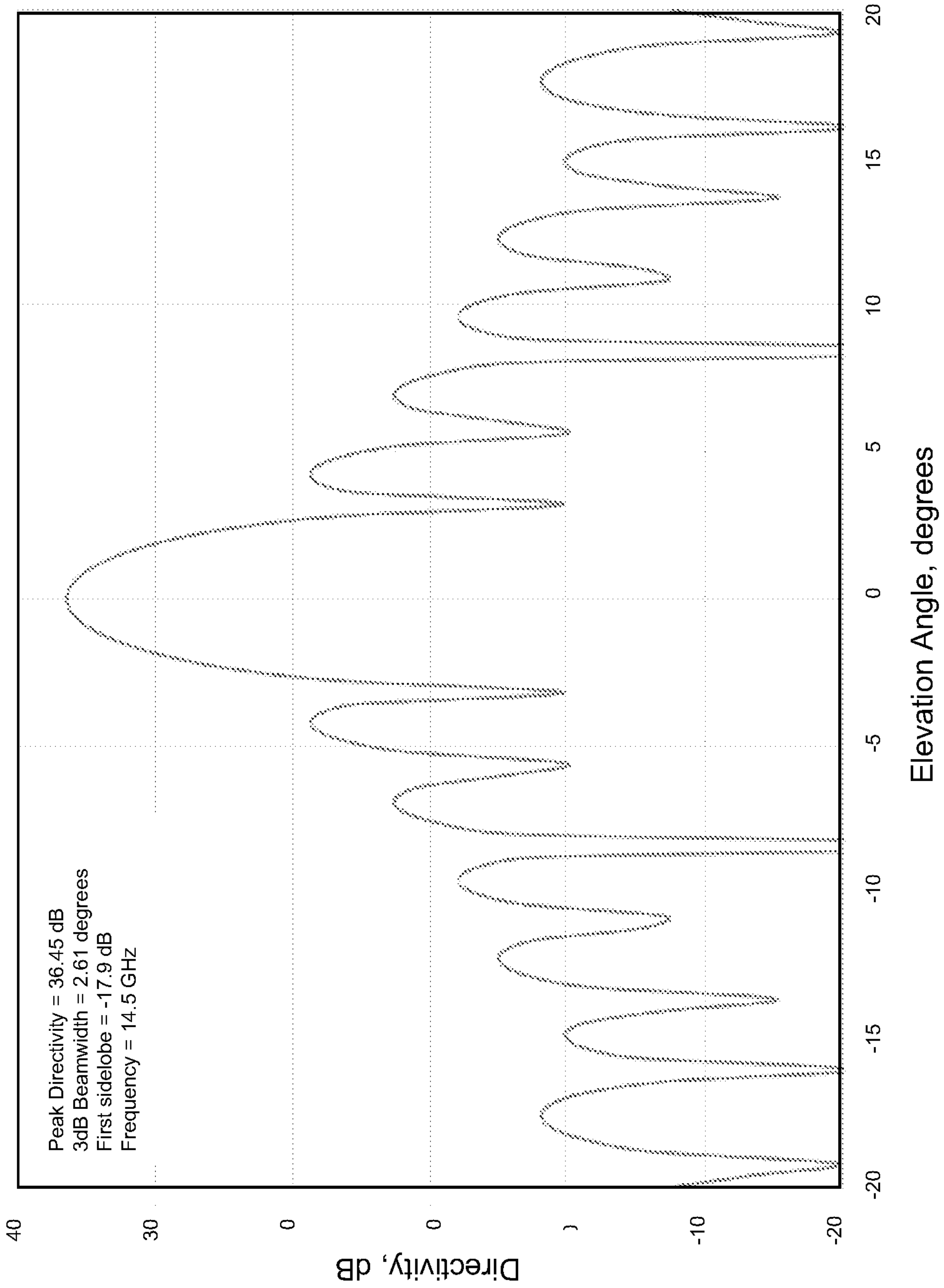
FIG. 4 provides a plot of directivity (elevation cut) of a 44×44 transmit aperture, in accordance with some embodiments of the present disclosure.
Figure 6:
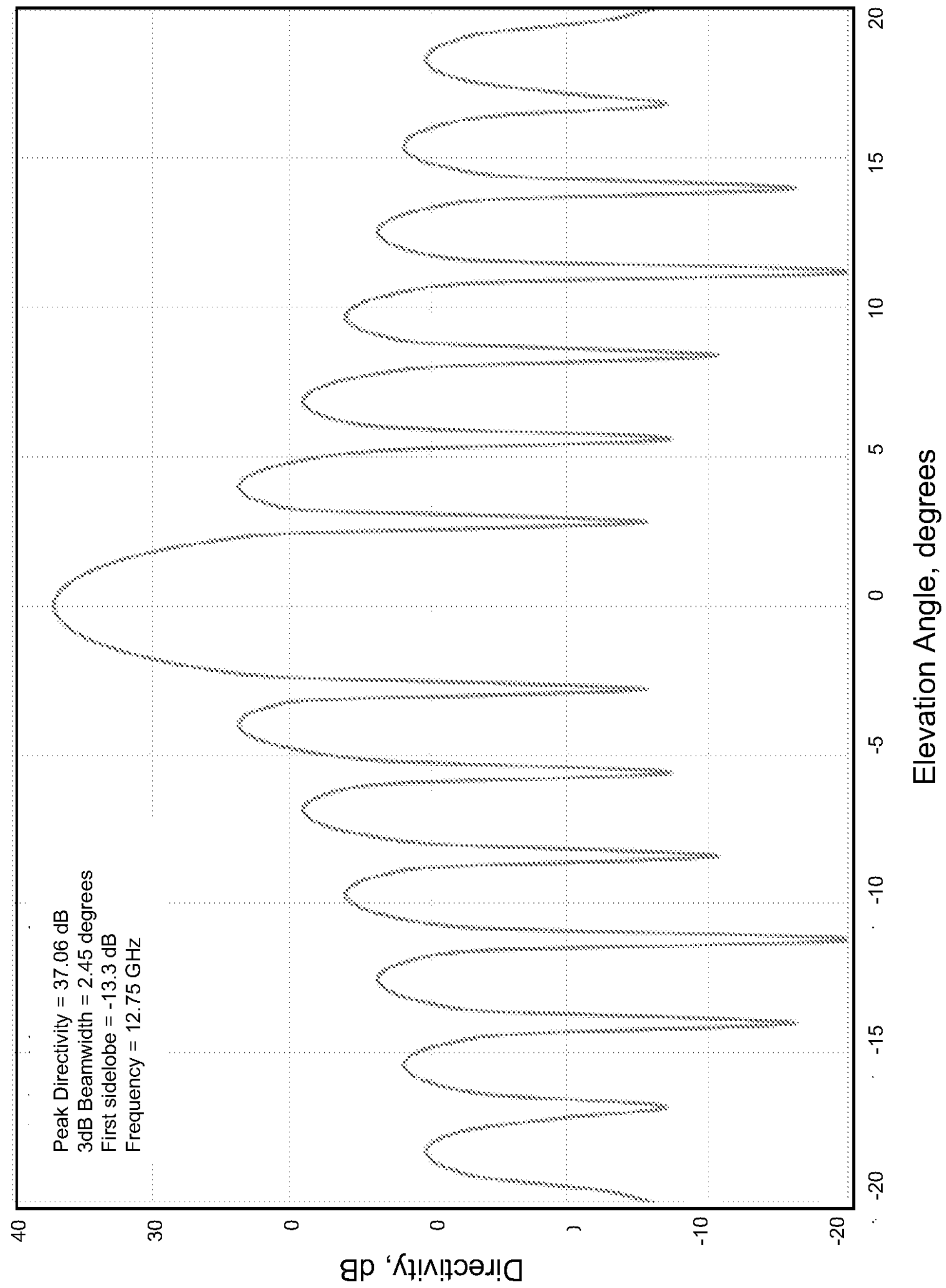
FIG. 6 provides a plot of directivity (elevation cut) of a 40×40 receive aperture, in accordance with some embodiments of the present disclosure.

FIG. 4 shows the directivity (elevation cut) of the 44×44 element transmit aperture at 12.75 GHz, in which all elements are active and steered to boresight, assuming 90% uniform illumination. Similarly, FIG. 6 shows the directivity (elevation cut) of the 40×40 element receive aperture at 12.75 GHz, in which all elements are active and steered to boresight, assuming 90% uniform illumination.

Figure 8A:
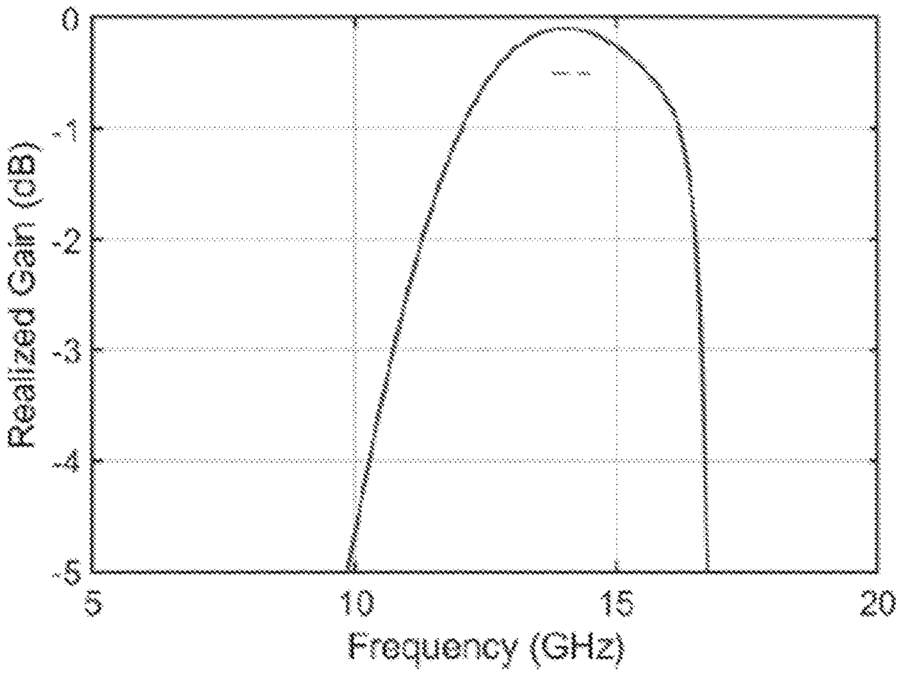
FIGS. 8A-B provide plots of performance versus frequency of the transmit fragmented aperture radiating elements, in which FIG. 8A provides a plot of realized gain, normalized to 0 dB, and FIG. 8B provides a plot of the magnitude of the reflection coefficient (F), in accordance with some embodiments of the present disclosure.
Figure 8B:
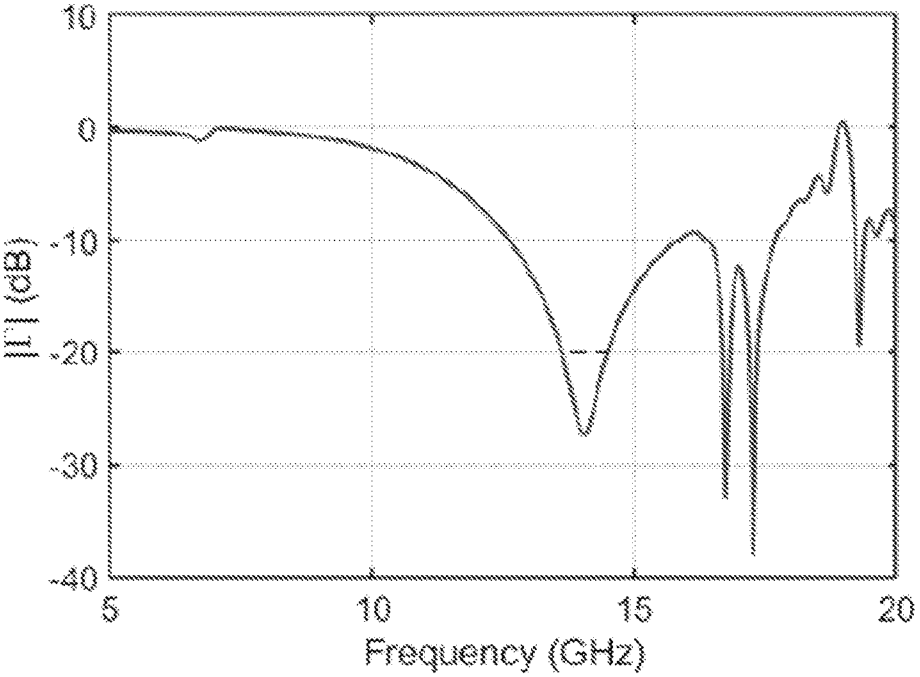

FIGS. 8A-B provide plots of performance versus frequency of the transmit fragmented aperture radiating elements. FIG. 8A provides a plot of realized gain, normalized to 0 dB, and FIG. 8B provides a plot of the magnitude of the reflection coefficient (F).

Figure 10A:
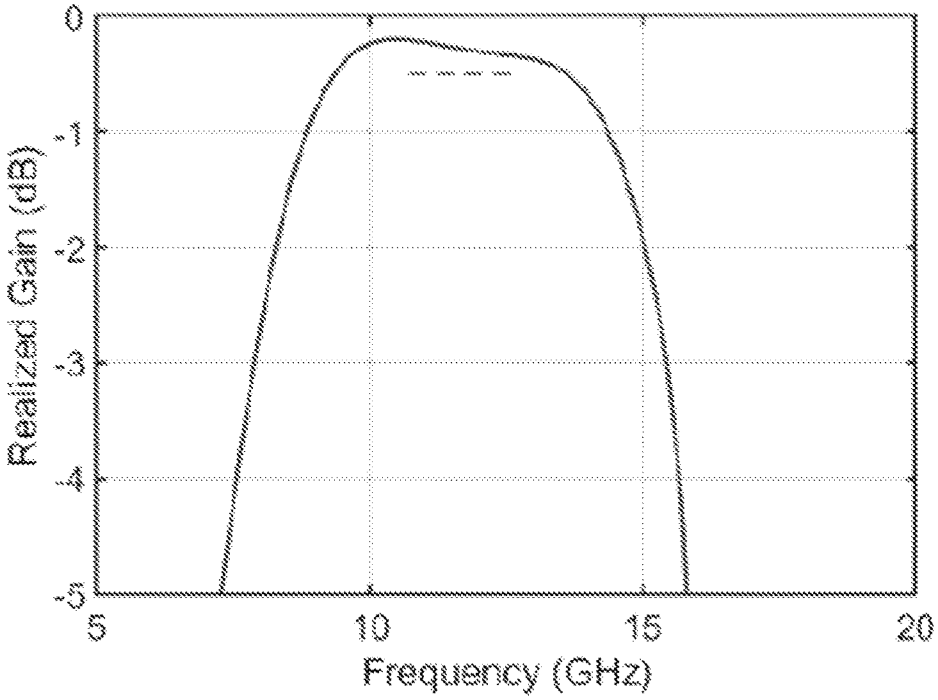
FIGS. 10A-B provide plots of performance versus frequency of the receive fragmented aperture radiating elements, in which FIG. 10A provides a plot of realized gain, normalized to 0 dB, and FIG. 10B provides a plot of the magnitude of the reflection coefficient (F), in accordance with some embodiments of the present disclosure.
Figure 10B:
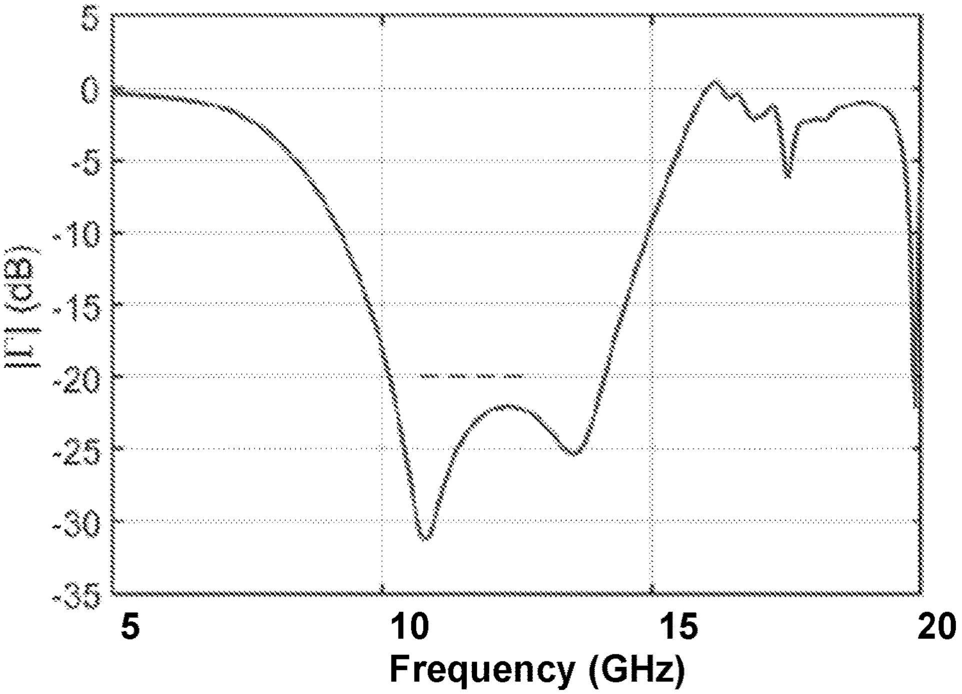

FIGS. 10A-B provide plots of performance versus frequency of the receive fragmented aperture radiating elements. FIG. 10A provides a plot of realized gain, normalized to 0 dB, and FIG. 10B provides a plot of the magnitude of the reflection coefficient (F).

Figure 11:
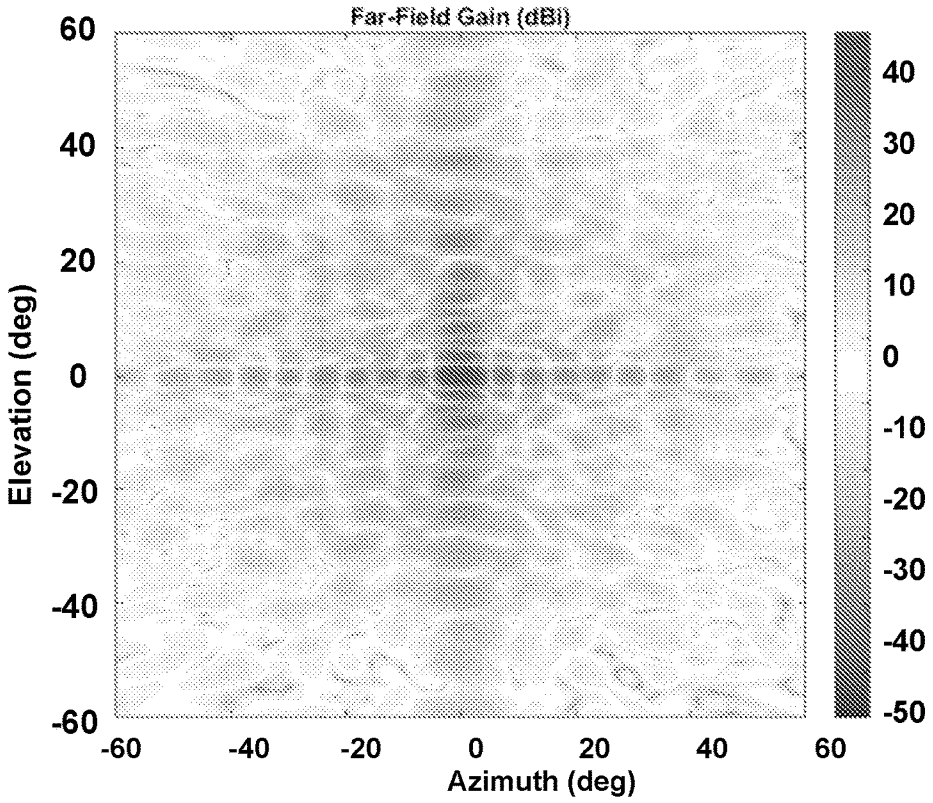
FIG. 11 provides a plot of measured far-field gain of the antenna in transmit mode, steered to boresight, vertical polarization, with a frequency of 14.125 GHz, in accordance with some embodiments of the present disclosure.
Figure 12:
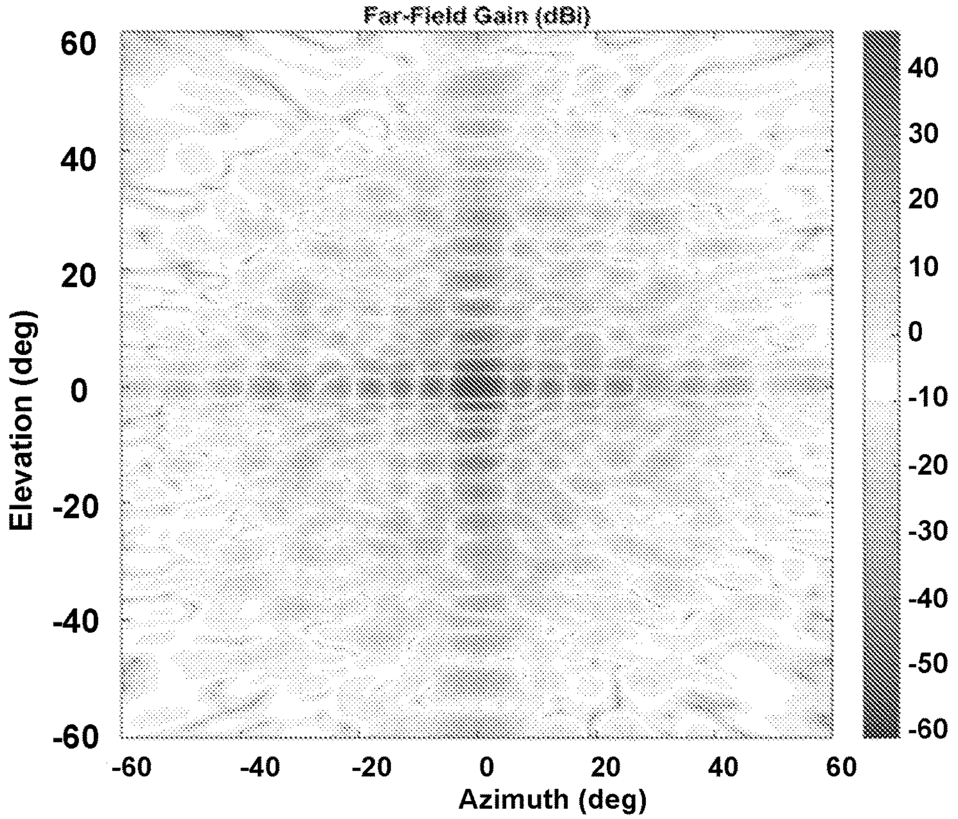
FIG. 12, provides a plot of measured far-field gain of the antenna in transmit mode, steered to boresight, horizontal polarization, with a frequency of 14.125 GHz, in accordance with some embodiments of the present disclosure.

FIG. 11 provides a plot of measured far-field gain of the antenna in transmit mode, steered to boresight, vertical polarization, with a frequency of 14.125 GHz. FIG. 12, provides a plot of measured far-field gain of the antenna in transmit mode, steered to boresight, horizontal polarization, with a frequency of 14.125 GHz.

Figure 13:
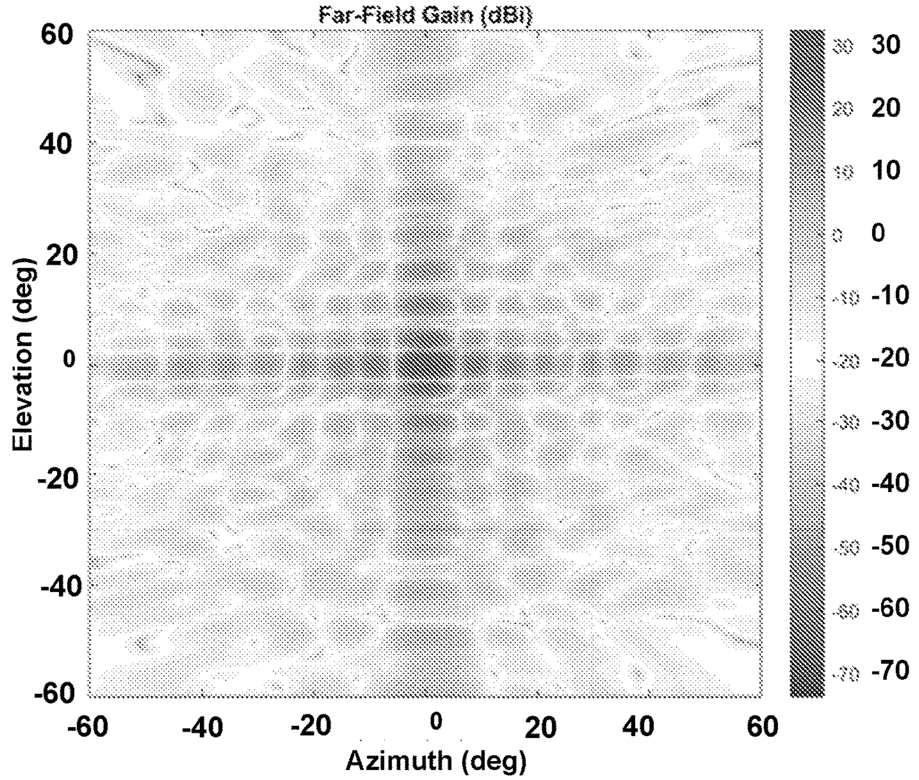
FIG. 13 provides a plot of measured far-field gain of the antenna in receive mode, steered to boresight, vertical polarization, with a frequency of 11.725 GHz, in accordance with some embodiments of the present disclosure.
Figure 14:
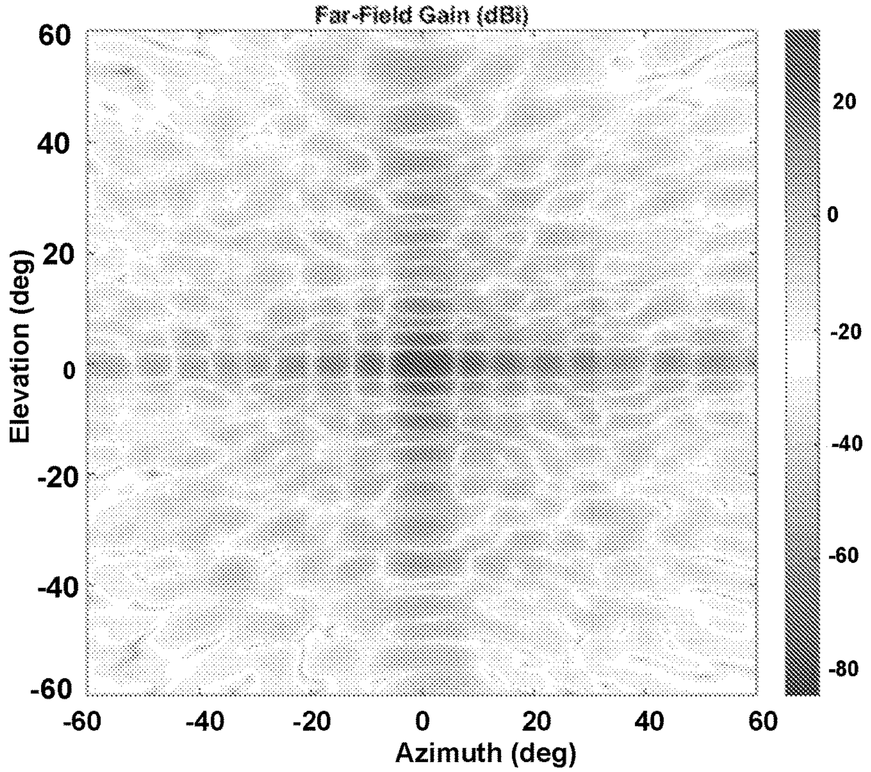
FIG. 14, provides a plot of measured far-field gain of the antenna in receive mode, steered to boresight, horizontal polarization, with a frequency of 11.725 GHz, in accordance with some embodiments of the present disclosure.

FIG. 13 provides a plot of measured far-field gain of the antenna in receive mode, steered to boresight, vertical polarization, with a frequency of 11.725 GHz. FIG. 14, provides a plot of measured far-field gain of the antenna in receive mode, steered to boresight, horizontal polarization, with a frequency of 11.725 GHz.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. An array antenna comprising:

a transmitter aperture comprising one or more first printed circuit boards, and a receiver aperture comprising one or more second printed circuit boards, wherein:

one or more of the second printed circuit boards comprise arrays of radiating elements, one or more of the radiating elements comprise arrays of pixels, and the receiver aperture is configured to receive a single beam.

2. The array antenna of claim 1, wherein:

one or more of the first printed circuit boards comprise first arrays of first radiating elements;

one or more of the first radiating elements comprise first arrays of first pixels;

the arrays of radiating elements of the second printed circuit boards are second arrays of second radiating elements;

the arrays of pixels of the second radiating elements are second arrays of second pixels; and the transmitter aperture is configured to generate a single beam.

3. The array antenna of claim 2, wherein the first and second pixels are conductive or non-conductive.

4. An array antenna comprising:

a transmitter aperture comprising one or more first printed circuit boards; and a receiver aperture comprising one or more second printed circuit boards;

wherein:

each first printed circuit board comprises first arrays of first radiating elements;

each second printed circuit board comprises second arrays of second radiating elements;

each first radiating element comprises first arrays of first pixels;

each second radiating element comprises second arrays of second pixels;

the transmitter aperture is configured to generate a single beam; and the receiver aperture is configured to receive a single beam.

5. The array antenna of claim 4, wherein at least one of:

the first radiating elements are configured to operate in a horizontal polarization;

the second radiating elements are configured to operate in a horizontal polarization;

the first radiating elements are configured to operate in a vertical polarization;

the second radiating elements are configured to operate in a vertical polarization;

the first radiating elements are configured to operate in each of a horizontal and vertical polarization;

the first and second pixels are conductive or non-conductive;

the second radiating elements are configured to operate in each of a horizontal and vertical polarization;

the transmitter aperture comprises four first printed circuit boards;

the first arrays of first radiating elements are arranged in 22×22 square arrays of first radiating elements; or the first radiating elements have a length of 1.07 cm and a width of 1.07 cm.

6. The array antenna of claim 5, wherein each of the conductive first pixels is metal and each of the non-conductive first pixels is non-metal.

7. The array antenna of claim 4, wherein the first radiating elements have an operating frequency of 13.75-14.5 GHz.

8. The array antenna of claim 4, wherein each of the first arrays of first pixels is arranged in a 64×64 array of first pixels.

9. The array antenna of claim 8, wherein each of the 64×64 arrays of first pixels is represented by the following hexadecimal sequence:

0x3c33cc0ff033cc3c07e1999e799987e087e1999e79998
7e183cf0f33ccf0f3c183cf0f33ccf
0f3c1e187fe1e787fe1877887fe1e787fe1067c0ff0c00
30ff0207e0ff0c0030ff0787801f800001f801
8e001f800001f80018000cfc3c3f302071980cfc3c3f30
6061f8067ffffe600609f8067ffffe61861ffe0
33cff3cc3e61e7f833cff3cc7e7987fe1e1ff8781e7f07e7
8e1ff870067e67e1c0f3cf00067efe7860f3c
f0006679e1e6181818000071e1fe08181180006781f8
40000386600619f9e000061ff80019f98000
0619f801806180001f99f807e067803c3fff980e607e00
3c7fff981e607e00001ffff81fe1ff81801ffe7
81981ffe1801ffe181981ffe1801ffe181fe1ff81801ffe7
81e607e00001ffff81e607e00007fff9817e0
6780003fff9801806180811f99f80019f981818619f80
619f9e3ffc61ff80781f843ffc3866001e1fe0f
fff1800069e1e61ffff800007fe78633ffcc0066767e1c3
3ffcc0067e07e7801ff800067e87fe001ff800
1e7fe7f800ffff007e79ffe000ffff003e619f80819ff98118
611f81819ff98180601983c0fc3f03c6068
003c0fc3f03c207e009f9e6679f90017819f9e6679f981
87e0000ffff0000787c0000ffff0000207887
f800001fe106e187f800001fe18780c0f000000f0301
80c0f000000f030186187e00007e186106187
e00007e18603c33cc0ff033cc3c; and wherein a binary 1 indicates the corresponding first pixel is metal and a binary 0 indicates the corresponding first pixel is non-metal.

10. The array antenna of claim 4, wherein at least one of:

each first printed circuit board further comprises a front-end beam forming integrated circuit;

each first printed circuit board further comprises a passive planar beamformer network;

each first printed circuit board comprises a substrate having a thickness of 0.060 inches; or each first printed circuit board has a dielectric constant of 3.5.

11. The array antenna of claim 4, wherein the receiver aperture comprises four printed circuit boards.

12. The array antenna of claim 11, wherein the second arrays of second radiating elements are arranged in a 20×20 square arrays of second radiating elements.

13. The array antenna of claim 12, wherein at least one of:

the second radiating elements have a length of 1.21 cm and a width of 1.21 cm;

the second radiating elements have an operating frequency of 10.7-12.75 GHz;

each of the second arrays of second pixels is arranged in a 64×64 array of second pixels;

the first pixels are conductive or non-conductive;

the second pixels are conductive or non-conductive; or the second pixels are metal or non-metal.

14. The array antenna of claim 12, wherein:

each of the second arrays of second pixels is arranged in a 64×64 array of second pixels;

the second pixels are metal or non-metal;

each of the 64×64 arrays of second pixels is represented by the following hexadecimal sequence:

0x300cc0cc3303300c0618799ff99e18608618799ff99e
186180f0c00ff0030f0300f0c00ff0
030f0660187fe667fe180660187fe667fe18060000f30
ff0cf00201800f30ff0cf006018067f9ff9fe60
6618067f9ff9fe61e67e003c33cc3c0380e6003c33cc3c
06018061867ffe6180070060867ffe611806
00043c3ffc3c386099863c3ffc3c6079ffe01867e61860
7967f98867e610606067f9c03ffc02000066
79e03ffc078000067f807ffe07860007e6007ffe1e0780
67e0000ff0380186e660000ff06198078606
660000019e01061ffe0000198600607f9e00021fe000f
9e79f80079e6181ffe7ff80019807877fffff8
00018079e79ffff80067807f879ffff80067807f87fffff8
00018079effe7ff8001980787f9e79f80079e
6181607f9e00021fe000061ffe0990198600860666199
8019e01e660000c3061980767e0000c3038
018607e60081811e0780067f8181818786006679e33ff
cc7800067f9c33ffcc2000067f98e1818706
060ffe01e18187860799986 0cf00f30607900040cf00f3
038600060e01818071806806 1e01818078
007e60300c00300c6017e0300c00300c38018080667e
66011e618180667e66018661830030ff0c0
0c600030030ff0c00c2060e1e0018007870661e1e001
800787860000c003c00300068000c003c00
300038e66018661806671 1e660186618066783 00cc0
cc3303300c; and a binary 1 indicates the corresponding second pixel is metal and a binary 0 indicates the corresponding second pixel is non-metal.

15. The array antenna of claim 4, wherein at least one of:

each second printed circuit board further comprises a front-end beam forming integrated circuit;

each second printed circuit board further comprises a passive planar beamformer network;

each second printed circuit board comprises a substrate having a thickness of 0.090 inches; or each second printed circuit board has a dielectric constant 3.5.

16. An array antenna comprising:

a transmitter aperture comprising one or more first printed circuit boards, each first printed circuit board comprising a 22×22 array of first radiating elements, each of the first radiating elements comprising a 64×64 array of first pixels, and each of the first pixels is metal or non-metal; and a receiver aperture comprising one or more second printed circuit boards, each second printed circuit board comprising a 20×20 array of second radiating elements, each of the second radiating elements comprising a 64×64 array of second pixels, and each of the second pixels is metal or non-metal.

17. The array antenna of claim 16, wherein each of the first and second radiating elements is configured to operate in each of a horizontal and vertical polarization.

18. The array antenna of claim 16, wherein at least one of:

each first radiating element has a length of 1.07 cm and a width of 1.07 cm;

each second radiating element has a length of 1.21 cm and a width of 1.21 cm;

each first radiating element has an operating frequency of 13.75-14.5 GHZ; or each second radiating element has an operating frequency of 10.7-12.75 GHz.

19. The array antenna of claim 16, wherein the 64×64 array of first pixels of each first radiating element is represented by the following hexadecimal sequence:

0x3c33cc0ff033cc3c07e1999e799987e087e1999e79998
7e183cf0f33ccf0f3c183cf0f33ccf
0f3c1e187fe1e787fe1877887fe1e787fe1067c0ff0c003
0ff0207e0ff0c0030ff0787801f800001f801
8e001f800001f80018000cfc3c3f302071980cfc3c3f30
6061f8067ffffe600609f8067ffffe61861ffe0
33cff3cc3e61e7f833cff3cc7e7987fe1e1ff8781e7f07e7
8e1ff870067e67e1c0f3cf00067efe7860f3c
f0006679e1e618181800007 1e1fe081811800067 81f8
40000386600619f9e000061ff80019f98000
0619f801806180001f99f807e067803c3fff980e607e0
03c7fff981e607e00001ffff81fe1ff81801ffe7
81981ffe1801ffe181981ffe1801ffe181fe1ff81801ffe78
1e607e00001ffff81e607e00007fff9817e0
6780003fff9801806180811f99f80019f981818619f80
619f9e3ffc61ff80781f843ffc3866001e1fe0f
fff1800069e1e61ffff800007fe78633ffcc0066767e1c3
3ffcc0067e07e7801ff800067e87fe001ff800
1e7fe7f800ffff007e79ffe000ffff003e619f80819ff98118
611f81819ff98180601983c0fc3f03c6068
003c0fc3f03c207e009f9e6679f90017819f9e6679f981
87e0000ffff0000787c0000ffff0000207887
f800001fe106e187f800001fe18780c0f000000f03018
0c0f000000f030186187e00007e186106187
e00007e18603c33cc0ff033cc3c; and wherein a binary 1 indicates the corresponding first pixel is metal and a binary 0 indicates the corresponding first pixel is non-metal.

20. The array antenna of claim 16, wherein the 64×64 array of second pixels of each second radiating element of the receiver aperture can be is represented by the following hexadecimal sequence:

0x300cc0cc3303300c0618799ff99e18608618799ff99e18
6180f0c00ff0030f0300f0c00ff0
030f0660187fe667fe180660187fe667fe18060000f30 ff0cf00201800f30ff0cf006018067f9ff9fe60
6618067f9ff9fe61e67e003c33cc3c0380e6003c33cc3
c06018061867ffe6180070060867ffe611806
00043c3ffc3c386099863c3ffc3c6079ffe01867e61860
7967f98867e610606067f9c03ffc02000066
79e03ffc078000067f807ffe07860007e6007ffe1e078
067e0000ff0380186e660000ff06198078606
660000019e01061ffe0000198600607f9e00021fe000f
9e79f80079e6181ffe7ff80019807877fffff8
00018079e79ffff80067807f879ffff80067807f87fffff80
0018079effe7ff8001980787f9e79f80079e
6181607f9e00021fe000061ffe099019860086066619
98019e01e660000c3061980767e0000c3038
018607e60081811e0780067f8181818786006679e33ff
cc7800067f9c33ffcc2000067f98e1818706
060ffe01e181878607999860cf00f30607900040cf00f
3038600060e018180718068061e01818078
007e60300c00300c6017e0300c00300c38018080667e
66011e618180667e66018661830030ff0c0
0c600030030ff0c00c2060e1e0018007870661e1e001
800787860000c003c00300068000c003c00
300038e660186618066711e66018661806678300cc0c
c3303300c; and wherein a binary 1 indicates the corresponding second pixel is metal and a binary 0 indicates the corresponding second pixel is non-metal.

* * * * *